United States Patent [19]

Lemelson

[11] 3,970,775

[45] *July 20, 1976

[54] SYSTEM FOR SCANNING INFORMATION RECORDED ON A PLURALITY OF MAGAZINE CONTAINED FILMSTRIPS

[76] Inventor: Jerome H. Lemelson, 85 Rector St., Metuchen, N.J. 08840

[ * ] Notice: The portion of the term of this patent subsequent to Feb. 29, 1989, has been disclaimed.

[22] Filed: Nov. 5, 1974

[21] Appl. No.: 521,028

Related U.S. Application Data

[60] Continuation-in-part of Ser. No. 295,807, Oct. 10, 1972, Pat. No. 3,881,053, which is a continuation-in-part of Ser. No. 224,131, Feb. 7, 1972, Pat. No. 3,699,266, and a continuation-in-part of Ser. No. 142,748, Aug. 28, 1961, Pat. No. 3,646,258, which is a division of Ser. No. 515,417, June 14, 1955, Pat. No. 3,003,119.

[52] U.S. Cl. ............................ 178/6.8; 178/DIG. 28
[51] Int. Cl.² ....................... G11B 7/00; H04N 7/18
[58] Field of Search ............... 178/DIG. 28, 7.1, 6.8; 352/123

[56] References Cited
UNITED STATES PATENTS
3,646,258  2/1972  Lemelson .................... 178/DIG. 28

*Primary Examiner* — Howard W. Britton

[57] ABSTRACT

An information storage and retrieval system is provided in which document information, such as images of documents and the like, is recorded on film strip disposed in magazines. Selective monitoring of individual image frames is effected by means of an electro-mechanical system in which selected film strip magazines and an electro-optical scanning device are selectively prepositioned with respect to each other and mechanical coupling is effected between a motor operated drive means and the film strip of the selected magazine, which is thereafter driven past the electro-optical scanning means until the selected image frame of the film strip is aligned with the scanning means. Information contained in the selected frame is then visually monitored and if it is desired to provide a hard copy thereof, a copy producing device is provided to generate a print.

12 Claims, 11 Drawing Figures

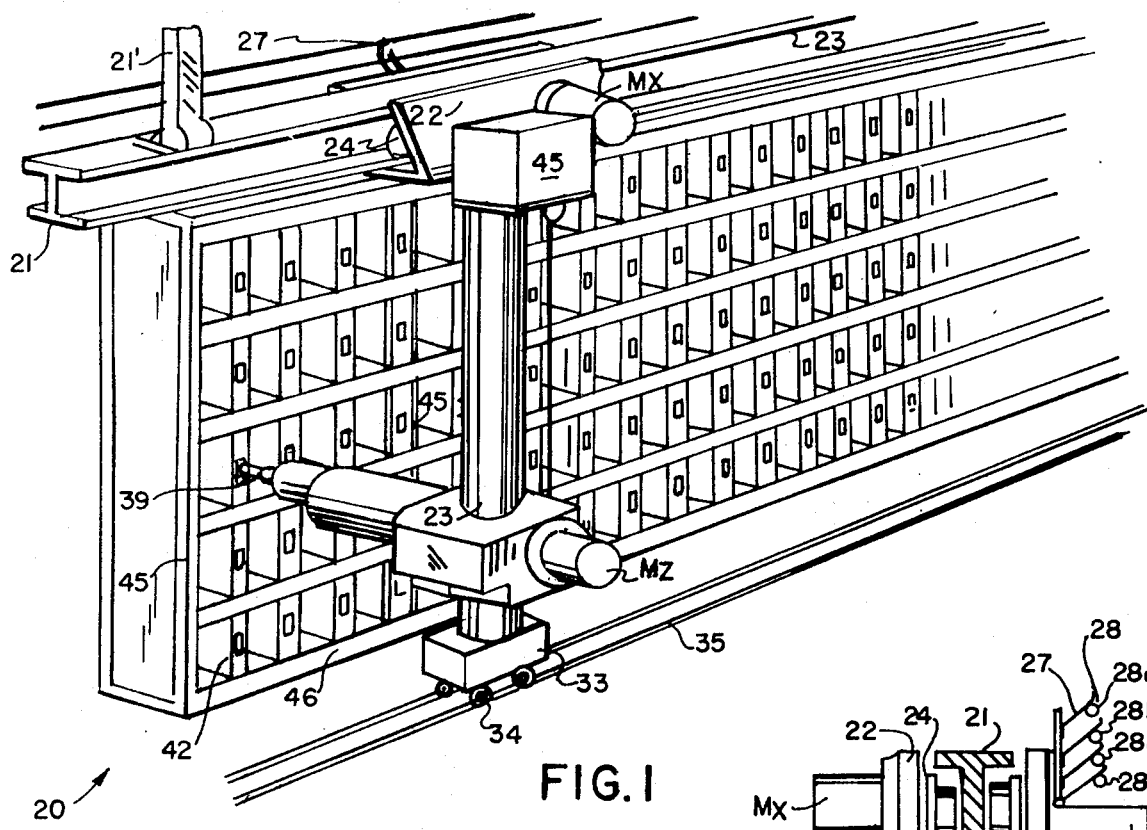
FIG.1
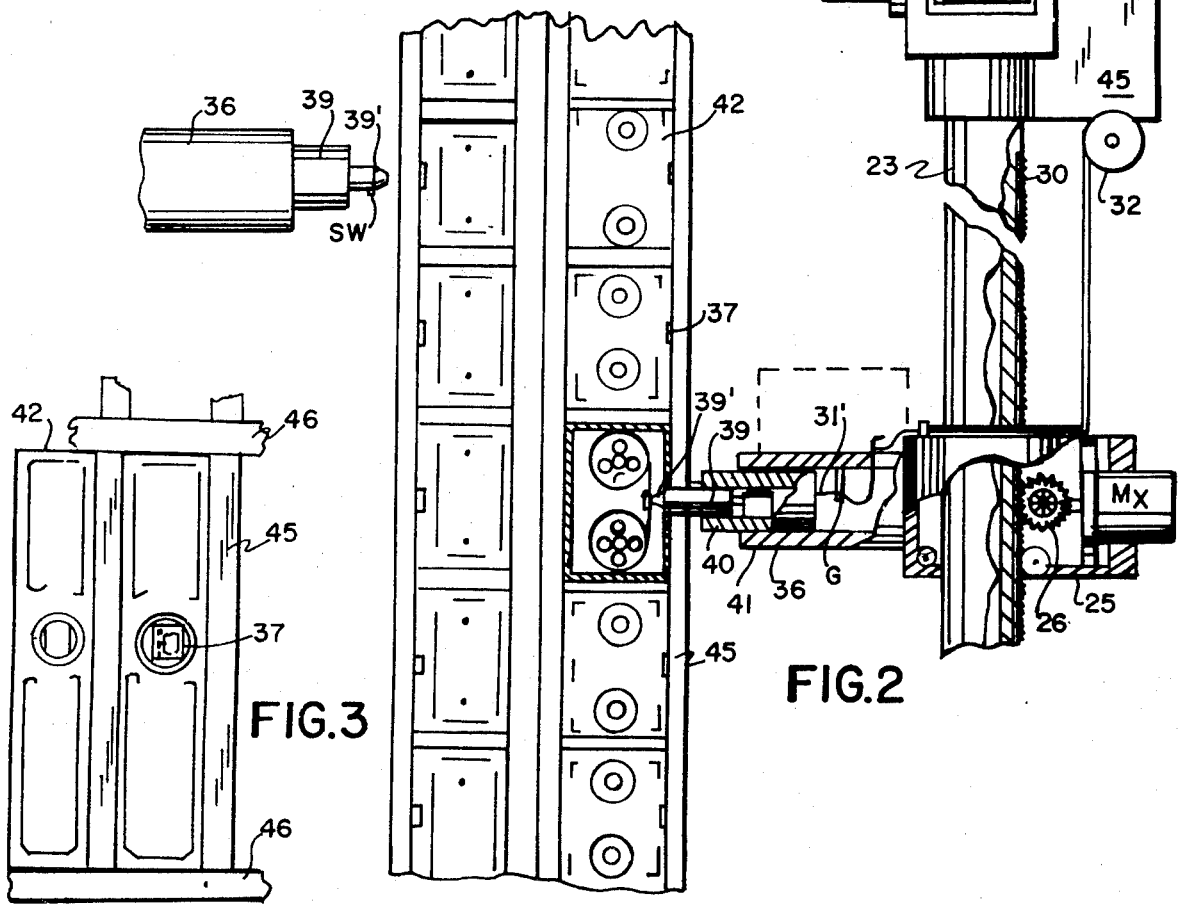
FIG.2
FIG.3

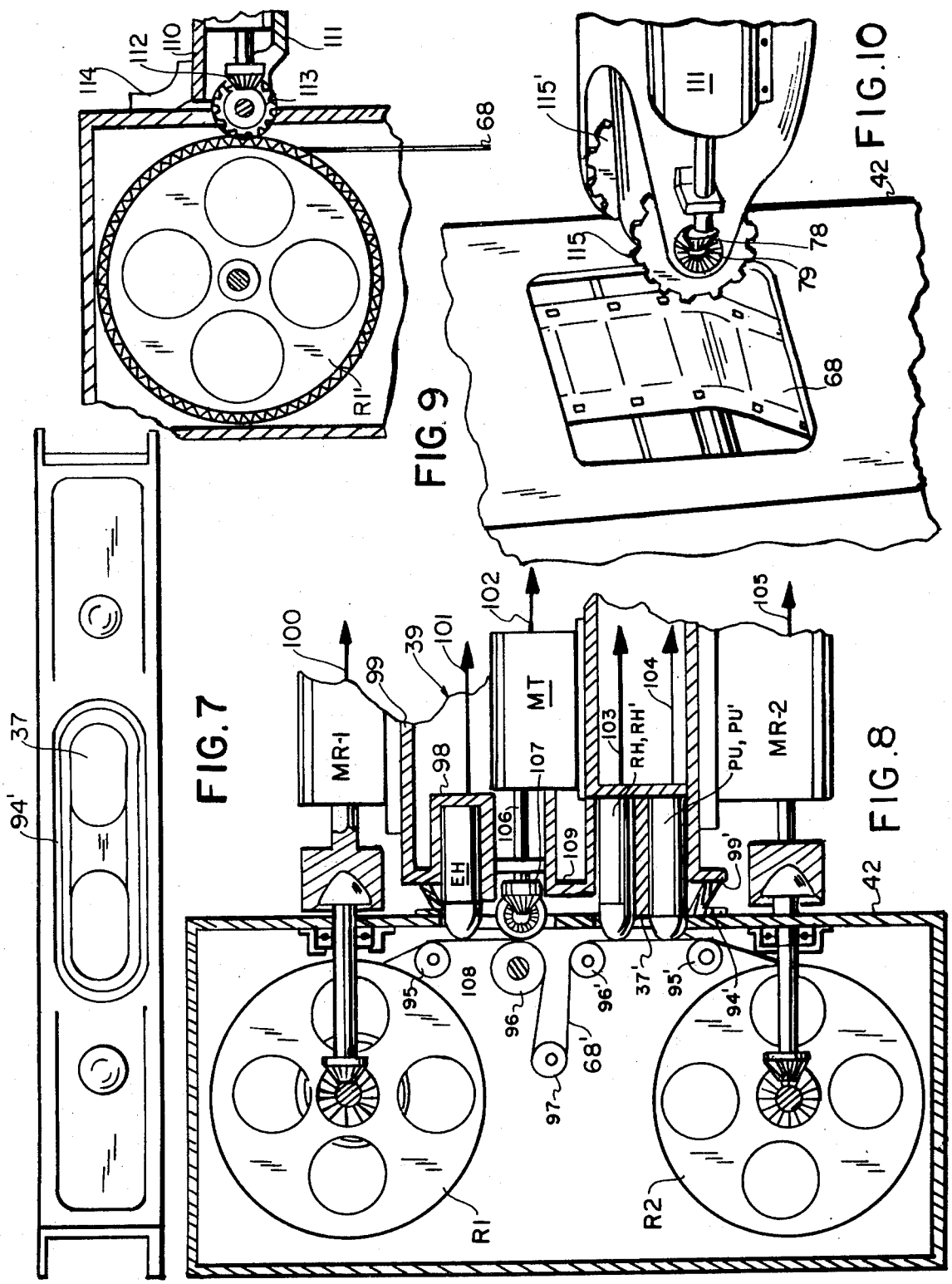

SYSTEM FOR SCANNING INFORMATION RECORDED ON A PLURALITY OF MAGAZINE CONTAINED FILMSTRIPS

RELATED APPLICATIONS

This is a continuation-in-part of application Ser. No. 295,807, filed Oct. 10, 1972, for Scanning System now U.S. Pat. No. 3,881,053, which was a continuation-in-part of application Ser. No. 224,131, filed Feb. 7, 1972, for Tape Cartridge and Transducing Means Therefor, now U.S. Pat. No. 3,699,266, a continuation-in-part of Ser. No. 142,748, filed Aug. 28, 1961, now U.S. Pat. No. 3,646,258, which was a division of application Ser. No. 515,417, filed June 14, 1955, now U.S. Pat. No. 3,003,119.

SUMMARY OF THE INVENTION

This invention relates to an apparatus and method for storing pictorial information such as recordings of documents in tandem array along narrow flexible record strips such as film strip, disposed in a plurality of magazines or cartridges which are supported side-by-side and one above the other on a stationary rack wherein a crane-like device is automatically controlled to move an electro-optical scanning device into alignment with a selected magazine whereat a driving unit is coupled to the tape or film strip of the selected magazine which is driven thereby until the selected frame recording thereof is in alignment with the electro-optical scanning device. Monitoring may then be effected by generating the image scanned by the electro-optical scanning device on a viewing screen adapted to display an enlargement of the selected image.

Before the making of the instant invention, document storage and retrieval systems varied from those employing the manual storage and picking of pages of information to a system in which a single reel of microfilm was scanned by an electro-optical viewer on which the reel was hand mounted. However, it is obvious that a system employing manual handling and mounting of reels of document information on a viewing apparatus suffers a number of disadvantages such as the consumption of a substantial amount of human effort and time in searching for selected reels of microfilm, mounting said selected reels on the viewing apparatus, selectively operating the drive means for the filmstrip of the selected reel, selectively rewinding the filmstrip on the reel after the selected frame has been monitored, dismounting the selected reel and returning it to storage. Accordingly, it is a primary object of the instant invention to provide a new and improved apparatus and method for storing document image information and selectively reproducing individual images of the information stored.

Another object is to provide an automatic apparatus and method for storing document information as a plurality of images on a plurality of filmstrips disposed in magazines wherein the magazines may be automatically accessed and the filmstrip thereof automatically driven and scanned to produce enlarged images on a viewing screen for monitoring purposes.

Another object is to provide a document storage and retrieval system employing magazines containing respective filmstrips of images wherein the magazines are predeterminately located in a storage volume and the filmstrip of each magazine may be scanned and remotely viewed without the necessity of handling individual magazines.

Another object is to provide an apparatus for storing a plurality of filmstrip containing magazines which apparatus includes an electro-mechanical scanning device which is automatically movable into alignment with a selected magazine and which contains a drive unit which automatically couples to the filmstrip of the selected magazines and may be remotely controlled to predeterminately drive the filmstrip to which it is coupled to bring a selected image frame thereof into alignment with the electro-optical scanning means.

Another object is to provide improvements in mechanisms for scanning image frame recordings on filmstrips disposed in different magazines and including a common transport for a scanning and filmstrip drive unit which may be operatively located with respect to a selected of a plurality of magazines in storage.

With the above and such other objects in view as may hereafter more fully appear, the invention consists of the novel constructions, combinations and arrangements of parts as will hereafter be more fully described and illustrated in the accompanying drawings, but it is to be understood that change, variations and modifications may be resorted to within the scope of the invention as claimed.

IN THE DRAWINGS

FIG. 1 is a perspective view of a portion of an information storage and retrieval apparatus employing film strip or tape containing frames of information, such as document recordings, provided in magazines wherein the information is derived by a removal fixture which operates to couple to a selected film strip or tape and to automatically drive same to permit to selected scanning of information recorded therein;

FIG. 2 is a partial side view with parts broken away for clarity, of a portion of the apparatus of FIG. 1;

FIG. 3 is a partial front view of two of the information conntaining magazines provided in FIG. 1;

FIG. 7 is an end view of another form of film strip or tape cartridge applicable to the apparatus of FIGS. 1–3;

FIG. 8 is a side view of the cartridge of FIG. 7 showing transducing apparatus for the information beaaring tape thereof;

FIG. 9 is a partial side view with parts broken away for clarity of a modified form of drive means for film strip or tape in a cartridge of the type defined in FIGS. 1–8;

FIG. 10 is a partial isometric view of a modified form of film strip drive means and FIG. 11 is a schematic diagram of an information storage and retrieval system of the types illustrated in FIGS. 1–10.

Figure 4:
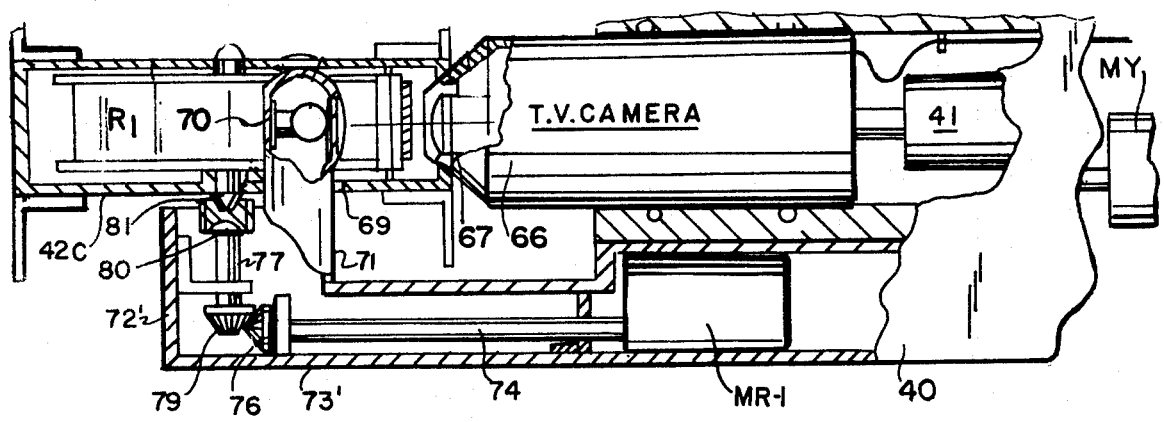
FIG. 4 is a plan view with parts broken away for clarity of a modified form of scanning device for information provided in film strip cartridges mounted as in FIGS. 1–3.

FIGS. 1 to 3 illustrate details of an automatic storage and reproduction system for document recordings provided on record tapes or film strips stored in magazines or cartridges, wherein individual image frames, such as so-called microfilm photographic images, may be selectively viewed on a display screen, such as the viewing screen of a storage tube or conventional television receiver cathode ray tube. The basic system consists of the following subsystems and components: (I) A plurality of magazines 42, each containing a record tape or filmstrip 68, having tandem frame recordings of images of documents, provided along the length of each filmstrip, with each frame recording containing, preferably, although not necessarily, on an adjacent track of the filmstrip, a code or frame mark which may be electrooptically, or otherwise, scanned to generate signals, such as pulses, as the filmstrip is driven and scanned. The pulse signals so generated, as will be described hereafter, may be utilized to uncount a counter to effect control of the main driving filmstrip, so that a selected frame, thereof, containing selected information may be prepositioned in the scanning field of the television camera or a direct viewing device for viewing selected of the frames of the filmstrip. (II) A scanning head assembly 39 which, by proper automatic control of a number of motors which are employed to variably position the head assembly throughout the storage racking which supports the magazines so that the tapes of selected magazines may be selectively scanned for remote monitoring purposes. The driving of a tape in a magazine to selectively position it may be accomplished by the control operation of one or more drive means, which becomes operatively coupled to the magazine and the tape thereof. The drive means is mounted adjacent to the scanning head assembly 39 and, in addition to being operable to engage the tape of a selected magazine, may also be operated to engage the driving mechanism associated with the selected magazine. (III) Signal transmission means, such as the shortwave transmitter of a television camera, employing wires or shortwave generating means to transmit signals derived in scanning the tape or filmstrip in the magazine, is provided to communicate the signals representing the scanned information to a remote location. (IV) Conveying means is provided for automatically driving and prepositioning the scanning head in alignment with a selected tape magazine and to effect coupling of the scanning head with selected magazines, to permit the reproduction of information from the tapes or filmstrips, thereof. (V) Suitable selection and controlled apparatus for controlling the movement of the scanning apparatus and the operation of the scanning head, such that it may be electrically, magnetically or pluroptically operated to derive information from selected recordings or frames of the tape. Such selection and control means is also operable to control the movement of the selected tape, to predeterminedly position a frame, thereof, with respect to the scanning head, so that it may be scanned, thereby, to generate an information signal which is capable of being monitored by remotely transducing same to a visual presentation of the scanned information.

In the perspective view, FIG. 1, racking 45R for a plurality of tape or filmstrip magazines 42 comprises an array of vertical-structural beams 45, fastened together with horizontal-structural beams 46 and joined, therewith, in a cage-like assembly 44, which is provided with means for holding an array of individual information storage magazines 42, thereon.

The magazines 42 are shown arranged adjacent to each other and are tiered in vertical rows, one above the other. In FIG. 1, the magazines 42 are shown as each containing a length of tape or filmstrip 68, having information recordings, thereon, with the tape movable past an opening 37 in an end wall of the magazine from one reel to another.

FIGS. 1 to 3 illustrate basic components of an automatic information storage and retrieval system having subsystem components which comprise: (a) A plurality of magazines 42 each containing a tape or filmstrip 68 containing tandem frames of image recordings. Each magazine is supported by racking and accessible to a scanning unit, such as a television camera, (b) A scanning head assembly 39 which may, by the control of servo motors, be automatically moved to engage part of a selected magazine and to reproduce all or part of the information recorded on the tape therein for remote monitoring. The driving of the tape in the magazine to selectively position it to permit the scanning of selected information recorded thereon may be accomplished by the controlled operation of drive means coupled to said magazine and mounted adjacent the scanning head assembly 39 so as to engage a magazine tape driving mechanism. (c) Signal transmission means such as television camera apparatus employing wires or shortwave generating means to transmit signals derived from the magazine mounted tape is provided to communicate the scanned information to a remote location, (d) conveying means for automatically prepositioning the scanning head in alignment with a selected tape magazine and to effect coupling of the scanning head with selected magazines for the reproduction of information from the tape thereof, (e) selection and control apparatus for controlling the movement of the scanning apparatus and control the operation of the scanning head such that it may electrically, magnetically or optically derive information from a selected recording on the tape. Such selection and control means is also operative to control the movement of the selected tape to predeterminately position a frame thereof relative to the scanning head so that it may be scanned to generate an information signal capable of being monitored by remotely transducing same to a visual presentation of the scanned information.

In the apparatus of FIGS. 1 to 3 a scanning camera or pick-up head 39' is provided and is conveyed past all the magazines of a storage rack by conveying apparatus which comprises a carriage 22 which is driven along an overhead mono-rail track 21 by a motor Mx mounted thereon. A fixture projects downwardly from said carriage, which fixture mounts a scanning apparatus 39 having a scanning head 39'. The carriage mounted fixture comprises a tubular column 23 affixed to and projecting outwardly from a second carriage and defining a laterally extending scanning head support 36 projecting from and movable up and down on column 23 and mounting the scanning head or mount 39'. Said lateral support 36 includes means for moving the scanning head laterally with respect to the second column 36 from a retracted position 39 to an extended position which is sufficient to permit it to engage tape of the information storage magazine or be positioned opposite the opening 37 therein and to thereby be in a position to transduce information recorded on the tape as it is driven past the opening. Motor means are also provided on column or platform 36 to power drive the tape in the magazine 42 through a projecting drive device, such as a shaped shaft, which is adapted to engage a mechanism mounted on the magazine when the pick-up head 39' moves into position. This has the advantage that only one tape driving mechanism is required. It is thus not necessary to provide a motor to power operate each magazine. Electrical control is also simplified.

Electric power is provided through overhead mounted conducting wires 28 which may be insulatedly mounted off the track 21. Remote control of the apparatus may also be automatically effected through the overhead wires 28 by transmitting control signals thereon or by wireless means. Notation 45 refers to a housing mounted on carriage 22 which contains signal receiving and control apparatus. The control apparatus mounted in 45 receives pulse control electrical signals generated on the wires 28, converts said signals to command control signals or holds them in relay storage, and effects control of the various motors by making and breaking circuits to position the pick-up device 39' opposite selected information storage units in the system. A motor Mx drives the carriage 22 along track 22. A motor Mz drives horizontal column 36 vertically on column 23. A third servo, Mz, which may be a push-pull solenoid, drives pick-up head 39' a sufficient degree to engage the selected magazine and is controlled in such action by a control device 45.

Conducting wires 31' extend from the pick-up head 39' through the column 36 and its supporting carriage 25 to a transmitter mounted on the column which transmits the signals generated by the pick-up head to a remote receiver. The control device 45 may include conventional television or radio transmitting apparatus.

It is noted that the illustrated overhead mono-rail conveying system for conveying the scanner or pick-up head to positions opposite selected of the magazines may also comprise an overhead bi-rail and crossbridge conveyor permitting conveyance of the pick-up head to one or more aisles between magazine storage racks, or a carriage which travels along floor mounted tracks. In another form of the invention, the information storage magazines 42 may be conveyed past one or more fixed reproduction heads.

FIG. 1 shows means for holding magazines 42 supported in orderly vertical and horizontal rows on a rack structure comprising vertical structural members 45 secured to horizontal structural members 46 each joined together where they intersect. The tape or film holding magazines 42 are secured to the members of the support structure in positions such that an exposed portion of the recording tape in each will be accessible to scanning or pick-up apparatus of the type described. The information recorded on the tapes of the magazines is preferably classified or coded such that it may be easily accessible upon command. The means for deriving information from a selected magazine is effected by automatically conveying and positioning electrically operated scanning apparatus to the selected magazine by predetermined control of the servo-motors driving the described conveying apparatus. When positioned in alignment a selected magazine, the pick-up head, when necessary, is automatically driven towards and coupled to or otherwise located with respect to the recording medium in the magazine such that the information recorded on the record member in the magazine may be transduced as a varying signal and transmitted to a remote location where it is monitored or further processed. Such further processing may include conversion of said signals to visually monitorable form such as images on the face of a television picture tube screen.

The conveying apparatus for transporting the pick-up apparatus to the selected magazines may comprise any type of conveyor which will perform the desired function. FIG. 1 shows an overhead mono-rail track 21 supported on brackets 21' extending from the ceiling of the storage room, and carriage 22 is supported by track 21 and adapted to be driven therealong by an electric motor referred to as Mx. A fixture or column 23 mounted on the said carriage 22 projects vertically downward therefrom and mounts a second carriage 25 which is drivable along column 23 by a second servo-motor Mz. The laterally extending column or platform 36 is affixed to a carriage 25 and adapted to travel vertically on column 23. The scanner 39 includes a scanning or pick-up head 39' which is mounted at the end of column 36 and is movable relative to column 36 and mounted within the end of platform 36. The pick-up head 39' may be of various types and may comprise transducing means for deriving signals from a recording on a magnetic surface or tape, optical apparatus for scanning picture film, or other known apparatus for scanning other forms of the known recording media. In order to transmit the signals generated by pick-up head 39' amplifying and transmitting apparatus are provided in a housing 45 mounted on the lateral column 36 adjacent to the pick-up head. Said housing may also be mounted on the vertical column 23, or the carriage 22. Electrical coupling between the movable components or assemblies illustrated may be effected by the use of sliding-brush contactors 27 or by the use of flexible wires of sufficient length to permit the maximum degree of motion between the movable components. Brushes 27 are shown mounted on the carriage 22 and overhead mounted wires 28 provide electrical coupling between the carriage and its assembly and the power supply connected thereto. The overhead wires 28a, 28b, 28c, etc. may also transmit command signals to the conveyor operating servo-motors from a remote location. Certain of the overhead wires 28 may also carry the signals generated by the pick-up head to a remote receiver.

Electrical coupling between the overhead carriage 22 and the vertically travelling carriage 25 is effected in FIG. 1 by a wire pair 31 which is spring wound on a take-up reel 32 mounted on the carriage 22 and electrically connected to the brush elements 27 riding on the overhead wires. In FIG. 2 the lower end of wire pair 31 is shown secured to the carriage 25, extends therefrom to the amplifier and transmitter 45 and is electrically connected to the movable pick-up head 39' by a wire pair 31' which is long enough to permit the head to project and retract.

The carriage 22 rides on the track 21, on wheels 24. Power operation of the carriage 25 vertically on column 23, is accomplished by means of a wheel or gear 26 driven by a motor Mz engaging a spur gear 30 secured to the column 23. Notation "G" refers to retainers for wires such as 31, and 31' which are mounted on and extend from the various conveyor components shown.

In FIG. 1 a carriage 33 is secured to the end of column 23 and has wheels 34 rotationally mounted thereon which ride on a track 35 secured to the floor of the storage area.

The pick-up head 39' is shown movably mounted in a housing 40 which is threadably mounted at the end of column or platform 36. Notation 39' refers to the scanning head which is part of an assembly or housing 39 and which may comprise magnetic reproducing head or heads, a lens of an optical scanning device supported within 39, such as a television camera, or other means for deriving signals of the recordings on the tapes in the magazines 42. The head 39' may also contain means for driving the tape within 42 automatically past the opening 37 in the magazine, and means for recording and reproducing signals relative to the tape.

In FIG. 2 a limit switch SW projects from the head 39' which may be used to effect stoppage of housing 39 after head 39' has just entered the opening 37 in the wall of magazine 42. The switch SW may be adapted, when actuated, to stop the operation of the lineal motor or solenoid 41 driving head 39' outwardly from 36.

Notations 43 and 44 refer to respective tape reels rotationally mounted within each magazine 42. In the arrangement shown in FIG. 2, no means are shown for driving the tape 68 past the pick-up head 39'. such drive means may be inherent to the storage racking or to each magazine by means of suitable electro motors and conventional tape drive mechanisms. Such tape drive means may be effected as illustrated in the other drawings by command control effected from a remote location such as by a person viewing a screen capable of displaying images of the recordings on the tape or by remotely located computing means. In another arrangement involving the automatic driving of the tape in the magazine, a limit switch SW' may be provided to be actuated when the pick-up head 39' passes into or becomes aligned with the opening 37 of a selected magazine.

FIG. 3 shows two magazines 42 secured between vertical rack members 45 and horizontal members 46. Switch SW' is shown mounted just below the magazine openings 37.

Figure 5:
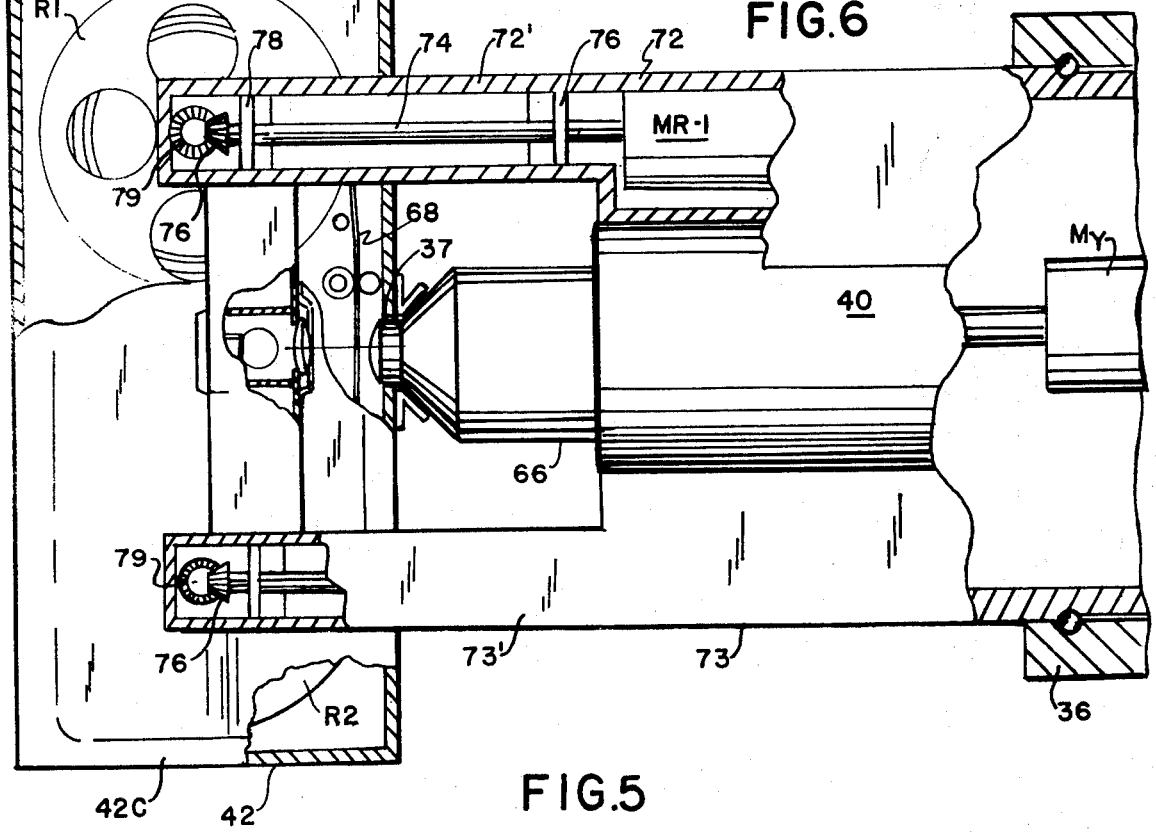
FIG. 5 is a side view with parts broken away for clarity of the apparatus of FIG. 4.

FIGS. 4 and 5 show a first magazine structure having, as the recording medium thereof, lengths of motion picture film. The magazine has a housing having parallel side and end walls which support two rotatable reels having film strip windable from one to the other, and also support tape guide means such as pins and rollers which guide the tape in its travel from one reel to the other.

FIGS. 4 and 5 also illustrate scanning apparatus for scanning the images of a magazine contained filmstrip which apparatus is operative to generate a video signal capable of being transduced to and projected as an image on a television tube screen. As the design of a conventional television camera or iconoscope is known in the art, the camera components are not shown but are assumed to be housed in housing 66 and may also be provided in the apparatus of FIG. 2. The pick-up head 66 comprises, in FIGS. 4 and 5, an aperture and lens housing 67 which is shown positioned in alignment with opening 37 in the end wall 42a of a selected magazine 42A.

Figure 6:
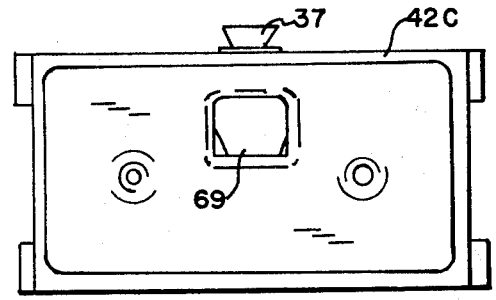
FIG. 6 is a side view of a modified form of film strip cartridge of the type provided in FIGS. 4 and 5.

The apparatus of FIGS. 4 and 5 is mounted on a conveyor assembly of the type hereinbefore described and also includes means for driving the film 68 within a selected magazine past an opening 37 in the end wall 42a thereof and means for providing sufficient light to illuminate the film to permit suitable scanning by the optical pick-up apparatus or camera 66. If the tape or film 68 is a positive print, a light source may be mounted just above the lens mount 67 of the camera, as shown in FIGS. 8' and 8" to illuminate the picture recordings on 68. However, if the film 68 of FIGS. 6 and 7 is microfilm or motion picture film an opening 69 is provided in the side wall 42c of the magazine housing 42H just behind the length of film extending between the two reels R-1 and R-2 illustrated in FIG. 5 to permit light to be passed to the T.V. camera. The reels R-1 and R-2 are supported in bearing by the side walls of the magazine 42. A light source 70 is insertable into said opening 69 and positioned behind the film 68. The light source is secured at the end of an arm 71 which is rigidly secured to the supports 72 and 73 at the end of an assembly which extends from the lateral conveyor arm 36 of the apparatus described above. The assembly of FIGS. 4 and 5 includes an arm or platform 40 which is movably mounted on the arm 36 extending from the conveyor carriages 25 and movable to engage a selected magazine by means of a servo motor or solenoid mounted on arm 40; a camera or pick-up head 66 which is axially movable relative to arm 40 by a servo motor or solenoid 41 mounted on arm 39; means mounted on arm 40 comprising an upper housing 72 in which is supported a motor MR-1 having a shaft 74 extending to near the free end thereof which shaft is supported in bearing by brackets 75 and 76 secured to the walls of housing 72 and a second shaft 77 coupled to shaft 74 through bevel gears 78 and 79. The second shaft 77 projects beyond the wall of the housing 72' and is provided with an end member 80 which is operative to engage a coupling member 81 at the end of a shaft 81 on which the upper reel R-1 is mounted and to thereby rotate said reel when the servo motor MR-1 operates. The lower housing 73 is similar to upper housing 72 having a motor MR-2 and shafts mounted thereon. The two elongated sections 72' and 73' of the housing 72 and 73 are jointed by a column 82 which mounts the lamp containing housing 71 which projects outward therefrom as illustrated in FIG. 6. The light housing 71 and shaft ends 77 are moved to the position illustrated in FIG. 6 to both preposition the light source 70 behind the film 68 and engage reel drive shafts 81 and 81' to drive the respective reels by suitable automatic control of the motors MX, MZ, MY, the motor or solenoid 41 which controls the motion of the base 40 axially relative to the column 39 and reel drive motors MR-1 and MR-2.

Automatically controlled operation of the scanning apparatus is effected as follows: The motor MX drives the assembly 40 to position housing 71 adjacent a selected magazine. The servo is then controlled to project the assembly 40 a degree such that housing 71 is positioned at the opening in the side wall of a selected magazine. Motor MX is then controlled to move the end of housing 71 into the opening 69 so that the light source 70 thereof may project a light beam through the filmstrip 68. The head 66 is then automatically projected from 40 by controlling servo 41 to cause scanning head 66 to engage the opening 37 so that said head 66 is positioned to receive light from lamp 70 after it has passed through filmstrip 68. The tape 68 is then controllably driven from one reel to the other and the information thereon may be remotely displayed as a motion picture or separate images. After displaying the information recorded on the film 68 the head 66 may be retracted and removed from the vicinity of the magazine.

FIGS. 7 and 8 shows a magnetic tape containing magazine and associated magnetic recording and pick-up apparatus for automatically effecting the functions of erasing and recording signals from remote sending apparatus relative to a magnetic tape 68' therein, and reproducing signals recorded on the magazine wound tape 68' and effecting the transmission of such signals to a remote receiver. At least three heads are shown mounted adjacent to and in line with each other and extend from a common base or housing 39 which is conveyed as hereinbefore described past an array tape containing magazines. The heads shown comprise a magnetic erasing head EH operative to erase, when energized, signals from the tape 68' of the magazine 42a when the tape is driven past said head. Such erasure prepares the tape for magnetic recording by a recording head RH. The notation RH' refers to a recording head disposed near an edge of the tape 68' and operative to record synchronizing or timing signals thereon. A magnetic pick-up head PU of conventional design is provided and a separate pick-up head PU' is operative to pick-up the synchronizing pulses recorded by head RH' for control purposes as will be described.

An opening 37' in the magazine end wall 42e' is shaped to permit all the heads to be inserted into the tape magazine housing into operative relationship with the tape 68'. The transducing heads are secured to base 39 by a housing 99 having receptacle portions 98 adapted to engage and hold said heads. The housing 99 also mounts the motors MR-1 and MR-2 which function to drive the magazine mounted tape reels R-1 and R-2 as hereinbefore described. Notations 100, 101, 102, 103, 104 and 105 refer to wires for powering extending reel motors MR-1 and MR-2, tape motor MT and heads EH, RH, PU, etc. MR-T is a servo motor which drives the tape 68' coactively with motors MR-1 and MR-2. The output shaft 106 of motor MT is coupled through bevel gears 107 and 108 to drive a wheel 108' which wheel is rotationally mounted on an arm 109 supported by housing 99 which positions it against the tape 68' as it rides against a free wheeling depressor wheel 96 which is rotationally supported in bearing between the side walls of the magazine 42 and the two wheels cooperate to drive the tape.

The transducing heads EH, RH and PH are operatively prepositioned relative to the tape 68' when the front face 99' of the housing 99 engages and seats against a guide 94' which is secured to the magazine peripherally about opening 37' therein. Notations 95, 95', 96' 96' and 97 define idler wheels which are free wheeling and rotatably supported by the walls of the magazine housing, and serve to operatively guide the tape 68' with respect to the transducing heads projecting through the opening 37' in the end wall of the tape magazine.

FIG. 8 shows a modified magazine structure and associated coupling arrangement. A tape reel R-1' is rotatably supported by the side walls of the magazine housing 42E. The periphery of reel R-1' contains gear teeth 113' formed integrally therein, which teeth are shown engaged by a circular gear 113 connected to a motor 111 and rotationally mounted on a support 110 which is supported by the base 39 which also supports the pick up head 39' such that both are simultaneously moved to drive the reel and transduce with respect to the tape. Thus reel R-1' is driven by the motor 111 mounted on support 110 and driving gear 113 through bevel gears 78 and 79 when the scanner and selected magazines are operatively coupled together. Notation 114 relates to a guide projecting from support 110 which engages the end wall 42a of magazine 42 to preposition support 110 during the transducing operation.

FIG. 10 shows a film drive means associated with a modified form of selectively positionable scanning apparatus of the type described which employs two sprocket wheels 115 and 115' rotationally mounted and positioned on respective support means 110' located at respective sides of the pickup and erase heads to engage border extending holes H such as provided in tape or conventional motion picture film. When the sprocket wheels 115 are rotated by a motor 111 through bevel gears 78 and 79 after engaging tape 68, the record member 68 may be automatically driven past the opening 37 in the magazine housing 42F. A guide wheel 96 is rotationally mounted behind the filmstrip 68 and is provided with spaced slotted cavities H' therein to receive the teeth of the sprocket drive wheels 115 and 115'. The erasing, recording and reproduction heads, EH, RH, & PU, are shown mounted between the wheels adapted to engage the surface of the tape 68.

Figure 11:
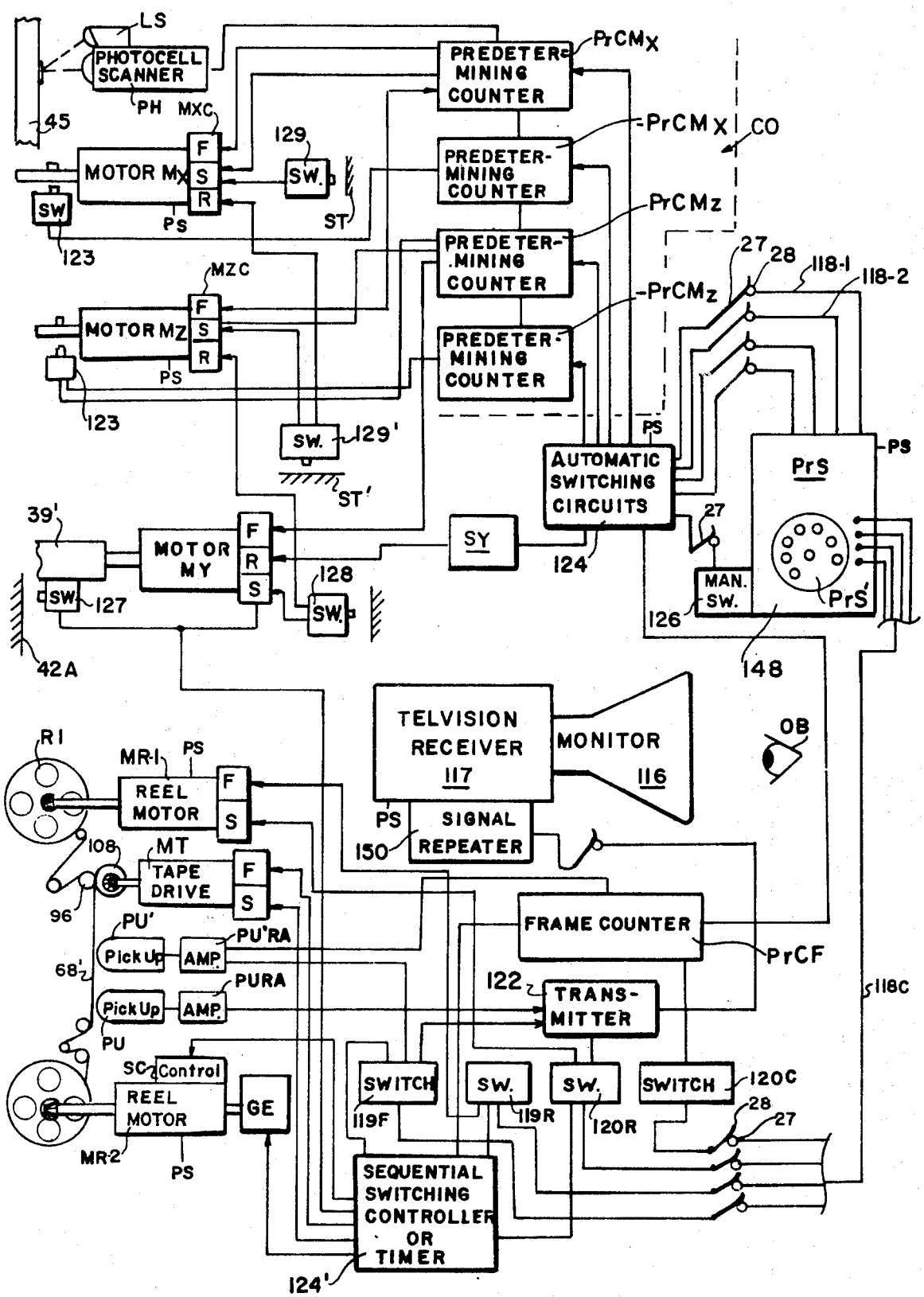

FIG. 11 illustrates a system and components for controlling apparatus of the type described herein. Certain assumptions are made with respect to the control systems illustrated, viz. (a) A source of power or electrical energy is assumed to be provided on the appropriate sides of all switches, counters, controllers, and other components. (b) Switching may be effected by direct switch closure by control pulses transmitted to the controlled components over wire, microwave or short wave channels. Conventional means for transmitting power or control signals are assumed to be employed for effecting the described automatic control recording of information.

FIG. 11 shows means for controlling the conveying apparatus of FIGS. 1 to 3 to transport and preposition the magazines, TV cameras or signal pick-up devices previously described, or suitable recording apparatus, with respect to a selected information storage magazine.

Notation 148 refers to a control panel having manually operated automatic selection controls denoted PrS, which includes a rotary selection switch PrS' of the type used in automatic telephone circuit selection. Other manually operated controls are also provided to effect further automatic control of the scanner conveying apparatus operative to sequentially control the various servo motors and thereby predetermine the movement of the conveying apparatus to position the pick-up or reproduction scanner opposite a selected information storage magazine and to further control the movement of the information storage medium therein. The control panel 148 is connected by wires 118 to transmit control signals or pulses to receiving means located on the conveying apparatus on the overhead conducting lines 28a, 28b, 28c, etc. Notation 124 refers to a receiver for amplifying and transmitting the control signals to predetermining counters denoted PrCMX, PrCMY, etc. which are operative for effecting control of the servo motors and other devices described for effecting controlled movement of the scanner conveying apparatus. The receiver 124 contains automatic switching means for distributing the pulses transmitted from rotary switch PrS to the corresponding predetermining counting devices denoted by the general notation PrCM. A first predetermining counting device PrCMX controls operation of the servo motor MX and a second counter PrCMX controls operation of motor MZ. Control is effected by transmitting a first pulse to the forward drive starting control of the particular servo motor and the transmission therefrom of position indicating pulses generated so the conveying apparatus is driven to uncount each of the preset predetermining counters. The uncounting pulses are generated either by a switch 123 actuated by rotation of the particular motor shaft or by a limit switch. The switch generated pulses are transmitted to uncount the preset predetermining PrCM counters. Upon uncounting, a particular preset counter generates a control pulse which is transmitted to energize a particular control or relay such as one defining the stop control of the particular motor controlled thereby. The motor start and stop controls are denoted F and S in FIG. 16 and notations R refer to the reverse drive controls for the motors. A second pulse, generated simultaneously with the first pulse, is effective to stop one motor and energize a relay in the start control F of the next motor thus starting same and a third pulse closes a circuit between the motor shaft actuated switch 123 for the next motor and the next control counter thus effecting automatic positional control in discrete steps.

Controlled drive of the recording medium or tape 68 at the selected magazine is effected by controlling the operation of motors MR-1, MR-2 and tape or filmstrip drive motor MT. These motors are controlled in their rotation either by forward and reverse switching controls forming part of control panel 148 and manually operated by the observer denoted OB who monitors a viewing screen 116 or by operating a predetermining selection control means activated by properly operating the rotary switch PrS' which presets a predetermining counting control device PrCF for controlling either the tape reel motors and/or the tape drive motor MT by utilizing the position indicating feedback pulses generated when frame indicating pulse recordings are reproduced from the frame lengths of the tape by the described pick-up means.

FIG. 11 provides control means whereby an observer at a remote monitor station may effect control of the motion of said conveying device from a first, or at-rest position into alignment with selected information storage units or magazines by dialing a rotary selection switch or actuating selection switches on a control panel, which switches are operative to preset selection devices to automatically effect the control of the motion of the conveying apparatus and scanner to any selected information storage unit or magazine and effect the further operations necessary to position said pick-up head for deriving information therefrom. The observer OB faces a viewing screen illustrated as a television picture tube and effects the reproduction of information from selected information storage units as visual images on the television viewing screen. Automatic selection-control means such as punch cards, keying devices, or command components of computing devices may also be employed to replace the manual selection control means described.

FIG. 11 illustrates means for deriving information from a selected tape magazine of the information storage system from a magnetic tape having video signals thereon which are reproducible as still images on the viewing screen of a CRT.

The control system of FIG. 11 may be varied as follows:

I. Manual selection means is provided to control the operation of the scanner conveying apparatus so that the information pick-up or reproduction head which is mounted on arm 39 may couple to a selected information storage unit and will be positioned to derive information therefrom. Selection of a magazine for scanning is effected by dial operating rotary stepping switch PrS' to cause said switch to generate and transmit pulse signals to a control computer CO, which is provided either at the monitor station or is situated in a housing 45 mounted on the conveying apparatus. Computer CO may comprise an array of predetermining counters or decades of counting relay banks which are predeterminately set-up or programmed by the pulse train generated by rotary switch PrS'.

If Automatic control of the video scanner and its conveying apparatus is effected in one manner by generating feedback pulses with movement of the scanner as the motors Mx, My and Mz operate, wherein each pulse defines rotation of a motor indicating by way of example, for instance, that the Motor Mx has driven the conveyor to a position opposite a selected information storage unit. The feed-back control pulses may be generated by limit switches 123 actuated by rotation of each motor shaft or drive mechanisms associated therewith, or by means of a photoelectric switch which is actuated with movement of the conveying apparatus along its track. In patent application Ser. No. 449,874 entitled "Automatic Production Systems", now abandoned, a photoelectric cell is employed to scan the storage racking and is activated by color marks or reflectors RE positioned at each storage location. The photoelectric cell may thus be used to generate position-indicating pulses. Similarly, a limit switch may be actuated as the conveying apparatus moves with respect to the racking. The generated pulses are then transmitted on lines 123' to the counting banks which they serve to uncount, thereby effecting positional control of the scanner head upon uncounting by generating pulses, or opening and closing circuits with the various servo devices or motors described.

The control of the conveying apparatus driving the reproduction apparatus to a selected information storage unit or magazine may be effected as follows: Each information storage unit or magazine is numerically classified. There will be, for example, ten rows of magazines stacked one above the other, each row having 100 individual magazines laterally adjacent to each other. The storage system is thus provided with 1000 information storage units each of which contains a large number of individual frames or documents recordings. The magazines may also each contain motion picture film which is projectable as a motion picture remotely from the storage area.

If the magazines denoted 1 to 100 are located in a first row, 101 to 200 in a second row, etc. and it is desired to view the information found in a magazine, which in the drawing, is classified as number 350, the dial switch PrS' is operated to generate such number as pulse trains. The first three pulses generated set up counter PrCMz which controls the movement of the mount for head 39' in the vertical direction by controlling operation of the motor Mz to drive the arm 36 so that scanning head 39' is positioned opposite the thid row of magazines. The next number 50 which is dialed, presets counter PrCMx to count out with the receipt of 50 pulses from the switch 123 as the head 39' moves from a home position past 50 magazines to a position where it is in alignment with the fiftieth magazine in the third vertical row. By providing suitable gear means, the limit switch 123 may be actuated with each rotation of the motor each time a pin on the output shaft of said motor engages said switch and the switch generates uncounting pulses which are fed to the respective counters and are an indication of the movement of the conveying apparatus. Upon receipt of the 50th pulse from the switch actuated by motor Mx, counter PrCMX uncounts and effects two control functions. These control functions result from operating control switches upon uncounting or by the generation and transmission of control pulses. For example, a pulse is generated and is transmitted to the stop control S of motor Mx, effecting the stoppage of said motor in a predetermined manner such that the apparatus is in alignment with the desired vertical row of magazines. A second pulse is also generated by counter PrCMX and applied to energize a control relay in the preset counter PrCMz which relay generates and transmits a pulse to the forward control F or motor Mz. Such vertical drive motor had previously been operated to position the column 36 mounting the scanning head at a high or low-vertical position. Assuming that the column 36 mounting scanner 39' is at the top of column 23, then motor Mz is operated to drive the carriage 35 down column 23 towards the selected magazine. Three pulses are generated by the limit 123-Mz 123-mz operated by motor Mz and are applied to the counter PrCMz. Upon receipt of the third pulse indicating that head 39' is aligned opposite the selected magazine classified by notation 350, counter PrCMz uncounts, and effects stoppage of motor Mz in a predetermined manner by energizing the stop control S of said motor. Control S of Mz is operative to effect braking of the motor Mz in a manner such that 39' will then be operatively located with respect to the selected magazine and may be further coupled to derive information therefrom by projection of the pick-up head into the magazine as described. A pulse transmitted from counter PrC Mz upon uncounting is applied to activate a control F of a motor or solenoid My which advances the head 39' into engagement with the magazine as defined by one of the means shown.

FIG. 11 provides control means for automatically controlling driving the record tape past the pick-up heads. The tape drive comprises a capstan drive wheel 108, driven by a motor MR-T and engaging the selected tape 68' against a stationary or spring loaded depressor wheel 96. Tape take-up is effected by operating motor MR-2 at a controlled speed.

Selection of the desired frame imformation may be effected by the dial-operated counter means of the type described. A dial-operated selection control is manually operated to effect the scanning of a selected frame of the recording medium or tape 68' of a selected magazine and the automatic reproduction and transmission of the signal recorded on the selected frame location to remote receiving apparatus at the monitor station, where the signal is further processed and converted to a visual image on a television video viewing screen. Further control of the movement of the tape 68' and the selection of other frame recordings thereof for reproduction is provided by manually actuated controls on the panel 148. Notations 119F and 119R refer to controls which are manually operative for effecting the reproduction of information from the frame immediately following the one just viewed by the observer. Controls 120F and 120R effect forward and reverse drive of the tape.

Notation 124' relates to relay actuated switching means for effecting control of the tape drive motors MR-1, MR-2 and MT which switching means are energized by pulses or control signals generated by the panel controls 119 and 120 or by pulses transmitted from the frame predetermining counter PrCF. The controller 124' also contains means for effecting speed control of the motor MR-2, which is utilized to effect the winding of the tape onto reel R2. It is necessary to maintain a constant tension on the tape 68' while it is being driven so that the reproduced signal will not be distorted and the tape will not stretch or break. The maintenance of constant tension may be accomplished by driving a generator GE connected to the shaft of motor MR-2 and using the medium of feedback to control the generator load to define a constant tension load. The feedback control components are contained in the control device 124'. As this type of feedback motor control is known to the art, it will not be described. A controller SC for the reel drive motor MR-2 contains both speed and on-off controls which are energized by relays energized by pulses generated by control device 124'. Device 124' is a relay actuated controller operative to receive signals from any of the control devices 119, 120 or counter PrCF and to channel such control pulses to controls for the motors MR-1, MR-2 and MT so as to effect controlled forward or reverse movement of the record tape. Where direct video scanning of images recorded on photographic film or printed tape is employed device 124' may comprise a terminal block operable to electrically connect PrCF or manual tape drive control 120 with the motor MR-2. Thus it will only be necessary to automatically position the selected frame of the tape in alignment with the scanning camera and only motors MR-1 and MR-2 need only be controlled without resort to complex tension or speed control. However, if the recording medium is magnetic tape, it is necessary to drive said tape at a predetermined and constant speed past the pick-up heads to reproduce selected picture signals which may be converted to still images on a video monitor.

The predetermining frame counter PrCF effects frame selection control by uncounting upon receiving-frame position indicating pulses reproduced by an auxiliary reproduction head PU' and recorded on a channel of the tape 68' other than the video picture signal recording channel. The frame signal pulses reproduced by head PU' are amplified in a reproduction amplifier PU'-RA and are fed to frame counter PrCF as the tape 68' moves. Upon arrival of the selected frame at head PU, the signal on the selected frame is reproduced by reproduction head PU, amplified in a reproduction amplifier PU-RA and passed to a video signal transmitter 122. Means for converting the video signal to an image is provided in greater detail in FIG. 17. Counter PrCF is preset by properly operating switch PrS'. When the reproduction head is located for reproducing signals from the tape 68', the starting control F of motor MT and the controls for motor MR-2 are activated by a limit switch 127' which is actuated by advancement of the scanning heads into operative position to initiate drive of the tape 68' past the reproduction heads. Upon uncounting, the counter PrCF activates the reproduction head PU to effect reproduction of the selected picture signal recorded on tape 68'. A pulse transmitted to transmitter 122 effects transmission of the selected video signal to the remote receiving apparatus. Another simultaneously generated control pulse effects control of the tape driving motors to stop the tape after the selected frame recording has passed the reproduction heads. The control 124' may contain means operative upon receipt of a pulse from counter PrCF for stopping motors MR-2 and MT and starting motor MR-1 to drive the tape in reverse to either rewind the tape onto reel R-1 or drive the tape a degree such that the frame immediately following the frame just reproduced from may be scanned next by operating frame selection control 119F.

It is noted that while it is required to move magnetic tape past the reproduction head for reproduction of the selected signal, employment of a video camera as the scanning means requires stoppage of the tape so that the selected image frame is aligned with the lens system of the video camera apparatus. These functions may be effected by suitably designing the frame selection control PrCF and the braking controls for motor MR-2 to effect stoppage of tape 68' with the selected frame thereof properly positioned with respect to the camera scanning system.

If photographic or motion picture film is utilized as the record medium, then the frame signal pick-up head PU' may comprise a photoelectric cell operative to scan an edge of the tape 68 or filmstrip containing frame indicating marks for generating pulses which are transmitted to the frame counter PrCF to cause its uncounting to effect control as described.

Notations 119F, 119R, 120F and 120R refer to manually actuated switches and controls mounted on control panel 148 which are electrically connected through wires 118C and the overhead wiring system to control components 119'F, 119'R, 120'F and 120'R mounted on the conveying apparatus. The control 119F effects forward drive of the tape 68' a degree such that the frame following the one containing information just monitored will pass the pick up heads and the signal recorded will be automatically reproduced and transmitted to the monitoring apparatus which includes a video receiver 117, picture tube 116 and other picture storage apparatus to be described. Notation 119R refers to control means for effecting return drive of the tape 68' a degree such that the frames prior to the one being viewed may be reproduced and monitored on picture tube 116, by further manually operating control 119F. Notation 120F refers to a control for effecting the sustained drive of the tape 68' forwardly past the reproduction apparatus and notation 120 refers to a manual control for effecting the rearward movement of the tape. The control 119'F is energized by a panel mounted control 119F which is a sequential switching device which automatically recycles itself each time it is energized. Control 119F' contains a first relay energized by a pulse generated by 119F which effects the starting of motors MT and MR-2 to drive the tape so that the next frame passes the reproduction head or is located in alignment with the TV camera. Upon receipt of the frame indicating signal reproduced by head PU', a pulse is generated by control 119'F and applied to the stop controls for the tape drive motors which stops said motors. Control 119'R, when energized, operates to control the operation of motor MR-1 to reverse drive the tape a predetermined degree. Control switch 120F is operative to activate a control relay 120'F which generates a pulse to activate the start control of the motors MT and MR-2. When switch 120F is released by the operator, the relay 120'F generates a second pulse which is applied to the stop controls S of motors MT and MR-2. In a similar manner switch 120R and relay 120'R controlled thereby, effect the reverse drive of tape or film 68'.

Summarizing, the means illustrated in FIG. 16 for selectively controlling the apparatus, may be described as follows: The operator requires access to stored information, dials selection switch PrS' according to the code denoting a selected magazine to be searched for information and he operates the dial switch to effect driving of the selected tape therein to position a selected frame for scanning. The predetermining counters PrCMX, PrCMY and PrCF are thereby set up or preset and are operative to effect a desired control sequence by uncounting with the receipt of feedback pulses to effect positional control of the conveying apparatus by controlling the motors driving the conveying apparatus from a starting position defined by a stop such as stop ST preferably located at a home location on the X directional trackway. Such feedback signal pulses are generated by counting motor shaft rotations or by scanning means activated as the apparatus passes predetermined positions located throughout the storage area. When so preset, counter PrCMX generates a first pulse which is applied to the starting control F of motor MX and starts the motor. Upon uncounting, counter PrCMX generates a pulse which is applied to the stop control S of motor MX effecting its stoppage and simultaneously generates a pulse at the start control F of motor MZ. While counter PrCMX counts down, a second counter PrCMX may operate to totalize the pulses received by PrCMX and may be used to control the return travel of the conveying apparatus to its starting position or to constantly monitor and determine the position of the conveying apparatus relative to its starting position. Motor MZ then drives the carriage 25 from a first position ST' to the vertical location of the selected magazine at which location the counter PrCMZ counts out and sends a pulse to the stop control S of motor MZ and a second pulse to the starting control F of motor MY. Motor MY then operates to project the pick-up head 39' to an operative position with respect to or against the selected magazine housing so that the motors MR-1, MR-2 and MT are respectively coupled to their magazine driving fittings, the pick-up or scanning means is aligned with or against the tape and the motor MT is in position to effect driving the tape past the scanning apparatus. If counter PrCF is employed to locate a selected frame of the tape for scanning, then tape drive motor MT and MR-2 are automatically started by a pulse from the limit switch 127 which is actuated when it contacts the front wall of the selected magazine 42. Limit switch 127 thus operates to stop motor MY with the head and apparatus engaged against or aligned with the selected magazine and the tape drive means of the conveyor coupled to the magazine input shafts. Counter PrCF controls the drive of the tape as described and controls 119 and 120 may also be employed to effect further control of tape movement in the act of searching for information recorded on said tape. The tape may be automatically driven to its starting position by sustained closure of the panel switch 120R. When the observer has finished searching information recorded on the selected tape, he may effect return of the conveying apparatus to a starting position by actuating a switch 126, sending a pulse to a holding relay Sy which bypasses switch 127 and reverses the motor or solenoid MY withdrawing scanner 39' from its coupling to the selected magazine 42. When scanner 39' moves to its retracted position, a limit switch 128 mounted thereon is actuated as it strikes a stop ST" generating a control pulse on the stop control of motor MY and simultaneously generating a pulse on the reverse control of motor MZ which then drives the carriage 35 to its lowest position on the column 23 at which position a limit switch 129' becomes actuated as it strikes a stop ST'. Limit switch 129 pulses respectively the stop control S of motor MZ and the reverse control R of motor MX. Motor MX then drives the carriage 22 to its home position at one end of the track 21 where a limit switch mounted on carriage 22 strikes a stop ST and pulses the stop control S of motor MX stopping the conveying apparatus thereat.

Modifications of the instant invention and further details of the disclosure found herein may be found in U.S. Pat. Nos. 3,699,266 and 3,881,053. For example, FIGS. 4 and 5 of said patents disclose a rotary rack of magazines containing filmstrips of the type defined herein and special scanning means therefor having features of the scanning means of FIGS. 1 to 3 herein. Also, details of certain of the components and subsystems found in FIG. 11 of this specification may be found in said patents.

I claim:

1. An apparatus for storing document information and selectively viewing portions of the stored information comprising in combination:
   a plurality of magazines each containing a filmstrip having a tandem array of frames of document recordings provided along its length,
   first means for retaining said magazines in a predetermined storage array and fixed with respect to each other,
   second means for engaging the filmstrip of a selected magazine and driving said filmstrip,
   third means for effecting relative movement between said second means and said first means to bring said second means into alignment with the filmstrip of a selected magazine,
   fourth means for controlling said second means to operatively connect to the filmstrip of a selected magazine when aligned with said filmstrip,
   fifth means associated with said second means and movable, therewith for driving said second means and causing said second means to drive said filmstrip in a fixed path,
   sixth means for scanning said filmstrip as it is driven in said fixed path and modulatable by the information recorded along said filmstrip for generating an output representative of said filmstrip information, and
   seventh means for receiving said output and displaying said filmstrip information in a visually-monitorable form.

2. An apparatus in accordance with claim 1, wherein said first means includes means for disposing a plurality of said filmstrip-containing magazines in side-by-side horizontal arrays and in vertical arrays, one above the other, so as to position said magazines in a plurality of rows and columns thereof and said second means includes a fixture having a carriage supporting said means for engaging and driving said filmstrip, and means for guiding said fixture in a path parallel to said rows of magazines, a vertical guideway for guiding said carriage vertically past said rows of magazines and means for guiding said vertical guideway in a direction parallel to and in the direction of said rows of magazines, means for selectively power driving said second means in a first direction parallel to said rows of magazines and means for power driving said carriage along said vertical guideway,
   control means for said power means for predeterminedly aligning said filmstrip engaging means of said second means with the filmstrip of a selected magazine,
   power means for operating said filmstrip engaging means to cause it to engage a filmstrip of a magazine with which it is aligned,
   means associated with said filmstrip engaging means for driving the filmstrip engaged, thereby, in a fixed path and
   scanning means supported by said second means and movable therewith for scanning the recordings of said filmstrip as it is driven and for generating information defined by the characteristics of the recordings scanned.

3. An apparatus in accordance with claim 2, wherein said scanning means comprises photo-optical means for scanning said filmstrip as it is driven and for generating electrical signals representative of the information scanned.

4. An apparatus in accordance with claim 3, wherein said scanning means comprises a television camera.

5. An apparatus in accordance with claim 1 wherein said filmstrips each contain frame indicating recordings including at least one recording associated with each document recording of the filmstrip for indicating the frame location and eighth means including means for scanning said frame indicating recordings as the filmstrip is driven by said fourth means and generating signals representative of the recordings scanned, and means for receiving and applying said frame indicating signals to controlling the operation of said fourth means to preposition a selected frame recording in the scanning field of said sixth means whereby the information defined by the selected frame may be scanned by said sixth means and presented to said means for displaying said information in visually monitorable form.

6. An apparatus in accordance with claim 5 wherein said eighth means is supported adjacent said second means and is in operative alignment with said filmstrip whereby it may scan said frame indicating recordings upon operation of said third means effecting relative movement between said first and second means and the operation of said fifth means driving said second means to cause movement of said filmstrip.

7. An apparatus in accordance with claim 6 wherein said eighth means comprises a photoelectric cell operable to scan frame indicating marks along a border portion of said filmstrip.

8. An apparatus in accordance with claim 6 wherein said eighth means comprises a photoelectric cell operable to scan said frame indicating recordings of said filmstrip and to generate pulses a pulse each time a frame recording is scanned thereby and counting means for receiving said pulses and controlling operation of said third means.

9. In an electro-optical scanning system employing filmstrips containing tandem arrays of image frames supported in a plurality of magazines which magazines are fixedly arrayed with respect to each other and an electro-optical scanning means for scanning selected frames of the filmstrips of selected magazines, the improvement comprising:
   a conveying means, filmstrip drive means supported by said conveying means and including a drive motor, means for automatically operating said conveying means to bring said filmstrip drive means into alignment with a selected filmstrip of a selected magazine, means for operatively coupling said filmstrip drive means with the filmstrip with which it is aligned, means for controlling operation of said filmstrip drive means motor to cause the filmstrip to which said filmstrip drive means is coupled to be driven along a fixed path, first scanning means for scanning individual frames of the filmstrip driven along said fixed path and means operatively connected to said first scanning means for visually presenting monitorable images of the frames scanned by said first scanning means, second scanning means for scanning said filmstrip as it is driven and generating signals with the movement of said filmstrip which signals are indicative of the movement of said filmstrip along said fixed path and the movement of the individual frames of said filmstrip past said first scanning means, means for receiving and utilizing the signals generated by said second scanning means to control the movement of said filmstrip along said fixed path and to align a selected frame of said filmstrip with said first scanning means to permit said first scanning means to scan said selected frame.

10. A scanning system in accordance with claim 9 wherein each of said filmstrips contain a plurality of frame indicating recordings including at least one frame indicating recording located adjacent to each of the frames of image information recorded thereon, and wherein said second scanning means comprises photo-optical scanning means for scanning said frame indicating recordings as the filmstrip is driven by said filmstrip drive means and means for passing the output of said photo-optical scanning means to said means utilizing said signals to control the movement of said filmstrip along said fixed path.

11. A system in accordance with claim 9 wherein said filmstrip drive means and said second scanning means are supported by said conveying means adjacent each other and each is simultaneously moved by said conveying means into operative location with respect to the filmstrip which is selected for scanning by said first scanning means.

12. An apparatus for storing and viewing information comprising in combination:

a plurality of magazines each containing a filmstrip having a tandem array of frames of recordings provided along its length, first means for retaining said magazines in a predetermined side-by-side array adjacent to each other, second means for engaging the filmstrip of a selected magazine and driving said filmstrip, third means for effecting controlled relative movement between said second means and said first means to bring said second and first means into alignment with each other and to align the filmstrip of a selected magazine with said second means, fourth means for controlling said second means to operatively engage the filmstrip of a selected magazine when said second means is aligned with said filmstrip, fifth means associated with said second means and movable therewith for power driving said second means and causing said second means to move said filmstrip in a fixed path, sixth means for scanning said filmstrip as it is moved in said fixed path by said second means, said sixth means being modulateable by the recordings along said filmstrip for generating output energy representative of said filmstrip information, and seventh means for receiving said output energy and displaying information recorded on said filmstrip in a visually monitorable form.

* * * * *